May 17, 1949.  B. R. BILLMEYER  2,470,599
LONG DRAFT APRON
Filed July 31, 1941
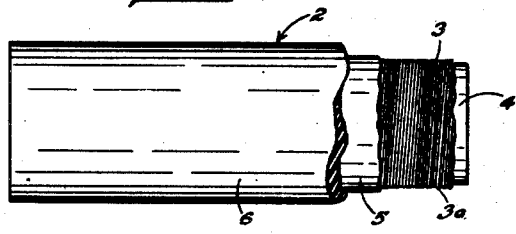
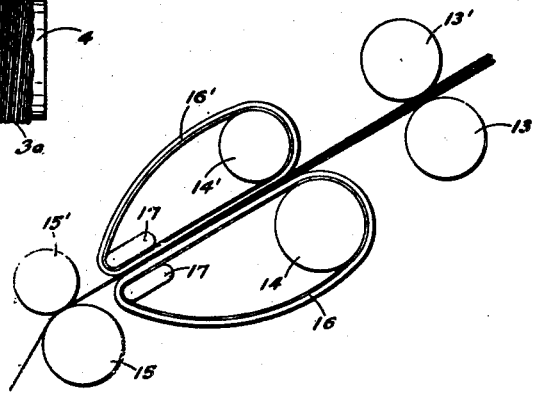
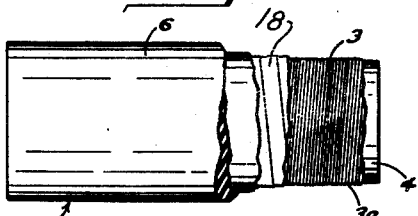
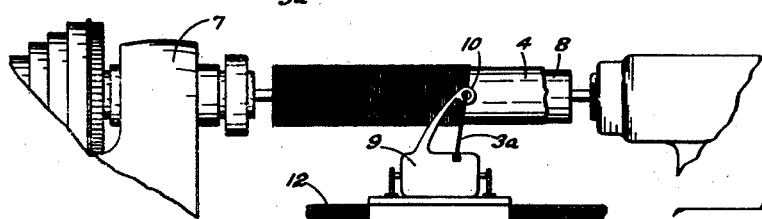
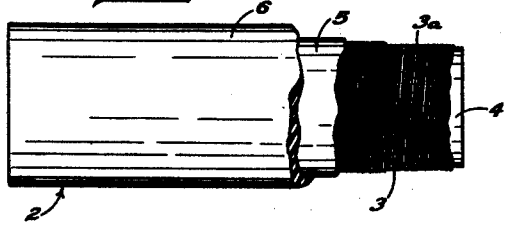
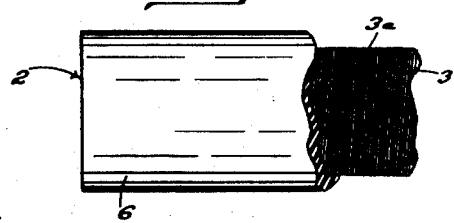
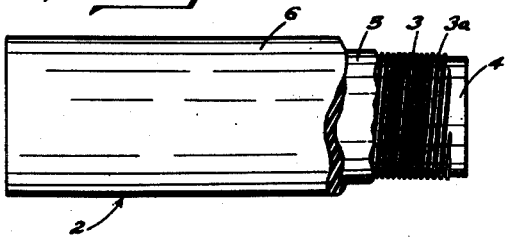
Inventor
Bruce R. Billmeyer
by
Walter + Kaufman
Attorney Patented May 17, 1949

2,470,599

UNITED STATES PATENT OFFICE 2,470,599

LONG DRAFT APRON

Bruce R. Billmeyer, Lancaster, Pa., assignor to Armstrong Cork Company, Lancaster, Pa., a corporation of Pennsylvania Application July 31, 1941, Serial No. 404,781

17 Claims. (Cl. 19—131)

This invention relates to long draft aprons and, more particularly, to a long draft apron including a strengthening and reinforcing layer formed of a plurality of convolutions of twine having applied to the outer surface thereof a wear-resistant facing of synthetic rubber. The term "twine" is used herein to denote strings, threads, cords, twists, small ropes, spun yarns, or the like of cotton, flax, silk, wool, nylon, glass fibers, rayon, or some other fibrous subtance capable of being wound in tubular form.

In the copending applications of Frank H. Carman, Serial Nos. 305,429 and 351,885, filed November 21, 1939, and August 8, 1940, now Patent No. 2,287,780, issued June 30, 1942, and No. 2,288,391, issued June 30, 1942, respectively, there are disclosed a long draft apron and a method of making the same in which the apron is composed of a seamless, tubularly woven fabric foundation, which is substantially inextensible radially, having a seamless, flexible wearing surface of synthetic rubber integrally united thereto. The apron so disclosed is highly satisfactory in use.

It is exceedingly difficult to manufacture tubularly woven fabrics to an exact diameter and, on the other hand, it is requisite that long draft aprons be manufactured to precise dimensions since, in the Casablancas system of long drafting, for example, no means for adjusting the rolls or guide bars is provided. In the manufacture of long draft aprons, it has been found that the tubularly woven fabric can be drawn over a mandrel only with extreme difficulty, if at all, if the fabrics be of slightly smaller diameter than the diameter of the mandrel. If it be of slightly greater diameter than the diameter of the mandrel, I have found that it may crease or fold over slightly during subsequent coating and forming operations. This condition is undesirable for it considerably decreases the service life of the apron and may permit the apron to stretch circumferentially in use. In addition, many sizes of tubularly woven fabric must be carried in stock since aprons are manufactured in various sizes and each size of apron manufactured requires a specific size of tubularly woven fabric. These disadvantages, accordingly, have increased the manufacturing costs of long draft aprons of this general type and have interfered to some extent with their extensive use in the industry.

The chief object of my invention is to produce a long draft apron which does not possess such disadvantages but retains the advantage of flexibility, frictional surface characteristics required for the purpose intended, which will not crack or check, which can be conveniently rendered of uniform thickness by grinding or buffing, and which will not stretch unevenly or to any substantial extent. An object of my invention is to produce a long draft apron including a strengthening and reinforcing layer of wound twine. A further object is to provide a foundation for long draft aprons including a tubular body of twine disposed in the form of a helix. A still further object is to provide an inexpensive long draft apron which is substantially inextensible radially and which possesses a seamless, oil-resistant wearing surface including synthetic rubber.

This invention relates to a long draft apron for use in fiber drawing which comprises a foundation composed of adjoining convolutions of twine forming a tube, and a wear-resistant facing integrally united therewith. Preferably, the foundation comprises a single length of twine wound and held in the form of a helix in which adjoining convolutions are disposed in abutting relationship and in which the angle of inclination of the convolutions is within the range of 80°–90° from a line drawn axially through the tube and preferably is as close as possible to 90°.

The attached drawing illustrates a preferred embodiment of my invention, in which Figure 1 is a view in elevation of my long draft apron, partially broken away to disclose the foundation;

Figure 2 is a diagrammatic view of the Casablancas system of long drafting including the long draft apron of my invention;

Figure 3 is a diagrammatic view illustrating a method of forming the tubular base foundation; and Figures 4, 5, 6, and 7 are views in elevation similar to Figure 1, illustrating various modified forms of my invention.

Referring to the drawing, there is shown in Figure 1 a long draft apron designated generally at 2. The apron 2 comprises a base foundation 3 of tubular form, a wear-resistant layer or coating 4 disposed interiorly thereof, a joining layer or coating 5 disposed exteriorly thereof and a wear-resistant, seamless tubular facing 6 disposed over and integrally united with the foundation 3 through the coating 5.

The foundation 3, preferably, is composed of a single length of twine 3a wound helically to form a tube. If desired, a plurality of pieces of twine may be wound in one layer to form a multiple threaded tube; in such case, the true pitch or distance between consecutive convolutions of the same piece of twine is greater than the distance between corresponding points in any two successive convolutions. The convolutions are placed in abutting relationship although, if desired, they may be spaced apart a distance not greater than the thickness of the twine; such abutting or slightly spaced apart relationship of the convolutions is designated herein by the term "substantially abutting." The twine may be composed of any natural or synthetic fiber of suitable strength for the purpose intended and cotton, silk, wool, rayon, flax, nylon, or glass fibers are examples of satisfactory materials for my purpose. A typical example of satisfactory twine for this purpose is a cotton cord, size #16, four-ply, ten twists to the inch.

In Figure 3, I have illustrated diagrammatically a method of making the foundation. There is shown a lathe 7 of usual type adapted to receive a mandrel 8 about which the twine 3a is wound or wrapped. A twine holder 9 contains a roll of twine which passes therefrom through an eyelet 10 to the mandrel 8. The holder 9 is mounted on a carriage 11 actuated by a lead screw 12 connected by suitable gearing (not shown) with the lathe actuating mechanism. The twine holder 9 is movable longitudinally of the mandrel 8 and, preferably, is moved forward a distance equal to the thickness or diameter of the twine being wound as each convolution is wound so that the adjacent convolutions abut or are under slight tension.

In the manufacture of the foundation, the mandrel 8 is coated with a layer of any suitable mold lubricant such as "Aquarex D" or a suitable soap solution to facilitate removal of the finished tube or apron. The wear-resistant layer or coating 4 is then applied to the mandrel 8. An end of the twine 3a is then secured to the mandrel and the lathe 7 and holder 9 actuated to wind the twine helically about the mandrel 8. Only slight tension need be placed on the twine to ensure satisfactory winding about the mandrel. The convolutions are wound in substantially abutting relationship to form the helical tube. The maximum space between convolutions should be no greater than the thickness of the twine for best results and, preferably, the convolutions are disposed in abutting relationship. The convolutions are wound with a slight inclination in either direction, toward the right as shown in Figure 3, so that the angles formed by the convolutions with a line drawn axially through the tube fall within the range of 80°–90°, and preferably, the inclination is as close to 90° as possible. It is desirable that such angles be kept at a maximum to ensure that the foundation of the apron is substantially inextensible radially. The joining coating 5 is then applied to the wound tube and permitted to dry. Such coating, if desired, may be formed from the layer 4 when the convolutions are slightly spaced apart or a separate coating may be applied. The foundation is then in condition to receive the wear-resistant facing 6. Preferably, facing 6 is composed of an extruded, seamless tube of tough, oil- and wear-resistant synthetic rubber. It will be understood, of course, either of coatings 4 or 5 may be dispensed with or, if desired, both coatings may be omitted or the twine impregnated with a solution of similar composition to the facing.

The facing is inflated and disposed over the foundation 3 and the combination of foundation 3 and wearing surface layer 6 is wrapped with wet fabric tape in order to obtain proper engagement of the wearing surface with the base. It is then vulcanized by placing the article in an open steam vulcanizer and applying steam for a period sufficient to cure the mass and to integrally unite the facing, tubular foundation and coatings; for example, 30 minutes at 300° F. will be generally satisfactory to obtain the required degree of vulcanization when synthetic rubbers such as "Hycar O. R.," "neoprene," or "Thiokol" are employed. The article is then removed from the mandrel and the surface is ground or buffed to a desired diameter. The tubing is then severed to desired length for use as long draft aprons.

The wear-resistant tubular facing 6 may be formed of a suitable synthetic rubber composition as shown in the following formula:

| | Parts by weight |
|---|---|
| Hycar O. R. | 100.0 |
| Anti-oxidant | 1.5 |
| Softeners | 21.5 |
| Stearic acid | 1.5 |
| Accelerator | 1.5 |
| Reinforcing pigment | 80.0 |
| Zinc oxide | 5.0 |
| Sulfur | 1.5 |

This mixture is suitably milled. Thereafter, it is fed to an extrusion machine of the screw type well known to those in the art and a hollow tubular body of desired size is produced adapted to serve as the wearing surface of the long draft apron. If desired, this composition may be calendered to form a thin sheet which is disposed about the wound tube and vulcanized to form a satisfactory seamless wearing surface.

The layers or coatings 4 and 5 may be formed of the above composition in sheet form or dissolved in a suitable solvent such as methyl ethyl ketone, acetone, cyclohexanone, chlorobenzene, chlorotoluene, butyl acetate, or amyl acetate. I have found a coating including 0.8 pound of "Hycar" to each gallon of solvent is of satisfactory consistency to be brushed in application.

In the above composition "Hycar" is a synthetic rubber of the type known as a polymerized butadiene acrylic nitrile copolymer. Other synthetic rubbers may, of course, be employed in forming the wearing surface and coatings 4 and 5, such as Thiokol (olefine polysulfide), neoprene (polymerized chloroprene), Koroseal (plasticized polyvinyl chloride), or similar copolymers containing a high content of chloride such as polyvinyl chloride-acetate copolymers or the like. Any of the materials of this character which possesses high resistance to oil, extreme flexibility and the characteristics of being extremely resistant to cracking upon continued flexing over long periods of time may be substituted. Rubber may be used in some instances where the service does not require a high degree of oil resistance. The method employed in forming the aprons may be varied depending upon the type of synthetic rubber employed; for example, Koroseal does not require vulcanization and aprons having wearing surfaces thereof need not be vulcanized.

In the above described composition, any suitable anti-oxidants may be used and "Neozone A," "Agerite Resin D," "Aminox," are examples of satisfactory materials. As softeners, I may use tricresyl phosphate, paraffin, dibutyl phthalate, pine tar, cumar, triacetin or the like. Accelerators are well known in the art and mercaptobenzothiazole, tetramethylthiuramdisulfide, diphenylguanidine, zinc butylxanthate, or combinations thereof, for example, may be used. The reinforcing pigments and fillers included in this composition may include any of various grades of carbon black, whitings, clays or the like such as "Thermax," "P–33," "Gastex," "Kalite," "Kalvan," etc. Zinc oxide is used in the composition primarily as an activator for the accelerators. Stearic acid is used as a plasticizer and aids in vulcanization. Sulfur, of course, is the vulcanizing agent. The ingredients and the amounts used may be varied as desired depending upon the properties required in the completed apron.

In Figure 2, I have illustrated diagrammatically the so-called Casablancas system of long drafting including my apron; it will be understood, of course, my aprons may be used satisfactorily in other long drafting systems such as that known as the Saco-Lowell Roth system. The Casablancas system comprises a series of positively driven bottom rolls 13, 14, and 15 and a plurality of top rolls 13', 14', and 15'; rolls 13' and 15' are rotated by frictional contact with the bottom rolls 13 and 15. The top rolls are weighted to apply pressure to the fibers. Aprons 16 and 16' are provided, apron 16 extending around bottom roll 14 and a guide bar 17 while apron 16' encircles idler roll 14' and a guide bar 17', being rotated by friction developed between the contacting surfaces of the aprons 16 and 16'. In this system, there is generally a short draft between the rolls 13, 13', and the rolls 14, 14' while rolls 15, 15' are usually rotated with a surface speed 6 to 30 times that of the rolls 13, 13'.

In Figure 4, I have illustrated a modified form of my invention in which the foundation 3 is composed of a layer of twine helically wound in one direction and a second layer of twine wound of opposite hand disposed thereover. The twine is wound in the manner described above and, if desired, an adhesive layer may be disposed between the layers to aid in retaining the convolutions as a helically wound tube. The tube may be composed of a single length of twine or a plurality of lengths as above described.

Figure 5 is generally similar to Figure 1 but illustrates the convolutions of twine forming the helical tube spaced apart a distance not greater than the thickness of the twine.

Figure 6 illustrates a modified form of apron in which the coatings 4 and 5 are omitted, the facing 6 being secured directly to the tube 3, the twine 3a composing the tube, preferably, being impregnated with a composition similar to that forming the facing or one compatible therewith to aid in securing a good bond between the foundation and the facing.

In Figure 7, I have illustrated a further modified form of my invention. In this case, a reinforcing fabric layer 18 is disposed over the foundation 3 and may be adhesively secured thereto if desired. Preferably, the layer 18 is composed of a fabric strip helically wound of opposite hand to the convolutions of twine forming the helical tube. The modification shown in Figure 7 is disclosed and claimed in my United States Patent No. 2,377,316 which issued June 5, 1945, as a continuation-in-part of this application.

My invention comprises a long draft apron including a wearing surface which is seamless, tough, flexible, oil resistant and which may be ground to a smooth, true surface of uniform dimensions. The foundation is substantially inextensible radially so that the apron cannot stretch thus materially increasing its life in service. The apron is economical, simply made, and does not require large capital expenditure or investment in stocks necessary for manufacture.

In my copending application, Serial No. 404,782, filed July 31, 1941, entitled Method of making long draft aprons, I have disclosed and claimed a preferred method of making the long draft aprons claimed herein.

While I have described and illustrated preferred embodiments of my invention, it will be understood my invention is not so limited since it may be otherwise embodied within the scope of the following claims.

I claim:

1. A long draft apron for use in fiber drawing comprising a tubular body of twine disposed in the form of a helix, a wear-resistant layer of synthetic rubber composition interiorly of said body, and a wear-resistant facing of synthetic rubber composition secured to said body.

2. A long draft apron for use in fiber drawing comprising a tubular body of twine disposed in the form of a helix, a wear-resistant layer interiorly of said body, an adhesive coating exteriorly of said body, and a wear-resistant facing secured to the body.

3. A long draft apron for use in fiber drawing comprising a tubular body of twine disposed in the form of a helix, a wear-resistant layer of synthetic rubber interiorly of said body, an adhesive coating disposed over said body, and a wear-resistant tubular facing secured to said body by said coating.

4. A long draft apron for use in fiber drawing comprising a foundation composed of a helically wound twine tube, a wear-resistant layer interiorly of said tube, an adhesive coating exteriorly of said tube, and a seamless wear-resistant tubular facing disposed thereover, said facing, twine tube and layer being integrally united to one another.

5. A long draft apron according to claim 4 in which said facing includes as an essential ingredient a synthetic rubber chosen from a group consisting of a polymerized butadiene acrylic nitrile copolymer, a plasticized polyvinyl chloride, a plasticized polyvinyl chloride-acetate copolymer, an olefin polysulfide, and a polymerized chloroprene.

6. A long draft apron for use in fiber drawing comprising a tubular body of twine wound in helical form, said body including a plurality of convolutions inclined in one direction and a plurality of convolutions of opposite hand disposed thereover, a wear-resistant coating disposed interiorly of said body, a second coating disposed thereover, and a wear-resistant facing secured to said body.

7. A long draft apron according to claim 6 in which the coatings and the facing include as an essential ingredient a synthetic rubber chosen from the group consisting of a polymerized butadiene acrylic nitrile copolymer, a plasticized polyvinyl chloride, a plasticized polyvinyl chloride-acetate copolymer, an olefin polysulfide, and a polymerized chloroprene.

8. A long draft apron for use in fiber drawing which comprises an inner, tubular, wear-resistant body, a reinforcement layer disposed over the exterior surface of said body and securely united therewith, said layer being formed of a plurality of convolutions of twine disposed in the form of a helix, at least some of said convolutions being spaced apart to permit said body to appear therebetween, and a wear-resistant facing disposed over said reinforcement layer and integrally united therewith and with the inner body where it appears between the convolutions.

9. A long draft apron for use in fiber drawing which comprises an inner, tubular, wear-resistant body of synthetic rubber composition, a reinforcement layer disposed over the exterior surface of said body and securely united therewith, said layer including a tubular body composed of a helically wound twine tube, the convolutions forming the tube being slightly spaced apart and embedded in said inner body, and an outer, wear-resistant facing disposed about said twine tube and integrally united therewith and with the inner body where it appears between the convolutions.

10. A long draft apron for the use in fiber drawing according to claim 9 in which said facing includes as an essential ingredient a synthetic rubber chosen from a group consisting of a butadiene acrylic nitrile copolymer, a plasticized polyvinyl chloride, a plasticized polyvinyl chloride-acetate copolymer, an olefine polysulfide, and a polymerized chloroprene.

11. A long draft apron for use in fiber drawing comprising a strengthening and reinforcing element including a plurality of convolutions of twine composing a tubular body having the form of a helix, at least some of said convolutions being spaced from adjacent convolutions, a wear-resistant layer interiorly of said body, an adhesive coating exteriorly of said body, and a wear-resistant facing secured to the body.

12. A long draft apron for use in fiber drawing comprising a tubular body of twine wound in helical form, said body including a plurality of convolutions wound in one hand and a plurality of convolutions of opposite hand disposed thereover, a wear-resistant layer of synthetic rubber composition disposed interiorly of said body, an adhesive coating disposed exteriorly of said body, and a wear-resistant facing secured to the body.

13. A long draft apron for use in fiber drawing comprising a strengthening and reinforcing element including a tubular body of twine wound in the form of a helix, a wear-resistant layer interiorly of said body, an adhesive coating exteriorly of said body, and a wear-resistant facing of synthetic rubber secured to the body.

14. A long draft apron for use in fiber drawing which comprises an inner, tubular, wear-resistant body, a reinforcement layer disposed over the exterior surface of said body and securely united therewith, said layer being formed of a plurality of convolutions of twine disposed in the form of a helix, at least some of said convolutions being spaced apart to permit said body to appear therebetween a wear-resistant facing disposed over said reinforcement layer, and an adhesive coating disposed between said facing and said twine securely uniting the facing with said twine and with the inner body where it appears between the convolutions.

15. A long draft apron for use in fiber drawing which comprises an inner, tubular, wear-resistant body of synthetic rubber, a reinforcement layer disposed over the exterior surface of said body and securely united therewith, said layer including a tubular body composed of a helically wound twine tube, the convolutions forming the tube being slightly spaced apart and embedded in said inner body, an outer wear-resistant facing disposed about said twine tube, and an adhesive coating disposed between said facing and said twine tube securely attaching the facing to said twine tube and to the inner body where it appears between the convolutions.

16. In a draft apron having a fiber working surface the combination consisting of a body of synthetic rubber arranged for engagement with the material being drafted and adapted yieldingly to accommodate and embrace such material, and a plurality of relatively heavy textile cords completely embedded substantially parallely to the longitudinal axis of the apron and closer to the surface which is opposite the fiber working surface of said apron and adapted to press the yielding body of synthetic rubber onto the material being drafted to place it under compression and yieldingly engage it and to move it by traction with the minimum of slippage.

17. In a draft apron having a fiber working surface the combination consisting of a body of acrylic nitrile butadiene copolymer arranged for engagement with the material being drafted and adapted yieldingly to accommodate and embrace such material, and a plurality of relatively heavy textile cords completely embedded substantially parallely to the longitudinal axis of the apron and closer to the surface which is opposite the fiber working surface of said apron and adapted to press the yielding body of acrylic nitrile butadiene copolymer onto the material being drafted to place it under compression and yieldingly engage it and to move it by traction with the minimum of slippage.

BRUCE R. BILLMEYER.

REFERENCES CITED

The following references are of record in the file of this patent:

UNITED STATES PATENTS

| Number | Name | Date |
| --- | --- | --- |
| 77,173 | Crague et al. | Apr. 28, 1868 |
| 113,140 | Caswell | Mar. 28, 1871 |
| 539,224 | Huss | May 14, 1895 |
| 1,988,491 | Hazell | Jan. 22, 1935 |
| 2,012,223 | Cutler | Aug. 20, 1935 |
| 2,046,136 | St. Claire | June 30, 1936 |
| 2,278,424 | Campbell | Apr. 7, 1942 |
| 2,287,780 | Carman | June 30, 1942 |

FOREIGN PATENTS

| Number | Country | Date |
| --- | --- | --- |
| 443,642 | Great Britain | Mar. 2, 1936 |